United States Patent
Kai et al.

Patent Number: 6,056,935
Date of Patent: May 2, 2000

[54] IRON SULFIDE AND PROCESS FOR PRODUCING THE SAME

[75] Inventors: Tadashi Kai; Yuji Matsue, both of Tokyo; Masaaki Sakurai, Kanagawa; Kunihiro Imada; Kenji Inokuchi, both of Chiba, all of Japan

[73] Assignee: Asahi Kasei Kogyo Kabushiki Kaisha, Osaka, Japan

[21] Appl. No.: 08/952,591

[22] PCT Filed: May 24, 1996

[86] PCT No.: PCT/JP96/01395

§ 371 Date: Nov. 24, 1997

§ 102(e) Date: Nov. 24, 1997

[87] PCT Pub. No.: WO96/37296

PCT Pub. Date: Nov. 28, 1996

[30] Foreign Application Priority Data

May 25, 1995 [JP] Japan .................................. 7-149718

[51] Int. Cl.[7] .................................................. C01G 49/12
[52] U.S. Cl. ........................ 423/561.1; 423/138; 423/148; 423/558
[58] Field of Search ................................. 423/561.1, 148, 423/138, 522, 558

[56] References Cited

U.S. PATENT DOCUMENTS 4,368,183  1/1983  Dörr et al. .............................. 423/522

FOREIGN PATENT DOCUMENTS

| | | |
|---|---|---|
| 58-79829 | 5/1983 | Japan . |
| 61-268357A | 11/1986 | Japan . |
| 61-60115B2 | 12/1986 | Japan . |
| 62-160142 | 7/1987 | Japan . |
| 5-98266A | 4/1993 | Japan . |
| 8-3567 | 1/1996 | Japan . |

OTHER PUBLICATIONS

Kohl et al. Gas Purification 4th Edition, Gulf Publishing Co., U.S.A., ISBN 0–87201–314–6, pp. 306–311 and 403, 1985.

Mellor Inorganic and Theoretical Chemistry vol. XIV, Longmans, Green & Co., Ltd., London GB, p. 144, 1947.

*Primary Examiner*—Steven P. Griffin
*Assistant Examiner*—Timothy C Vanoy
*Attorney, Agent, or Firm*—Finnegan, Henderson, Farabow, Garrett & Dunner, L.L.P.

[57] ABSTRACT

The invention provides an iron sulfide characterized in that it comprises $FeS_2$, $Fe_{1-x}S$, $Fe_3O_4$ and $FeSO_4$, and that the secondary particles thereof, have a 50% volume-cumulative particle diameter of from 20 to 300 $\mu$m. The invention also provides a process for producing an iron sulfide comprising the steps of introducing (a) ferrous sulfate monohydrate having a $d_{50}$ of from 20 to 300 $\mu$m and (b) not less than stoichiometric amount of at least one sulfur compound selected from elemental sulfur and hydrogen sulfide into the fluidized bed of a furnace and then fluidizing, burning, and reacting the ingredients at a temperature of from 350 to less than 630° C., a superficial velocity of 0.1 m/sec or higher, and a pressure of 1 atm or higher using air as a fluidizing gas.

12 Claims, 4 Drawing Sheets

600μm
(X30)

1.49 μm
(X 20,000)

5.00 μm
(X 6,000)

IRON SULFIDE AND PROCESS FOR PRODUCING THE SAME

This application is a national stage filing under 35 U.S.C. §371 of PCT/JP96/01395 filed May 24, 1996.

TECHNICAL FIELD

The present invention relates to an iron sulfide which can be used as a novel catalyst for coal liquefaction or heavy-oil hydrogenation, more particularly as a dispersion catalyst which exhibits excellent hydrogenation activity when used in converting a coal and a solvent or a heavy oil into a light oil in the presence of hydrogen. The present invention also relates to a process for producing the iron sulfide.

BACKGROUND ART

In the field of coal liquefaction, for example, attempts have been made to convert a coal to a liquefied oil through hydrocracking, and research and development works have been enthusiastically conducted since the achievement of the Bergius process. Many coal liquefaction processes have been proposed so far, including the new IG process, H-Coal process, SRC-II process and EDS process.

In coal liquefaction processes using catalysts, some catalysts are used by the ebullition bed method with liquefaction reactor, and others are used by being added to coal slurries. Known as a representative of the former are particulate catalysts comprising nickel, cobalt, molybdenum or the like supported on a support such as alumina. Known as a representative of the latter catalysts are powdery iron compounds such as iron oxide, iron ore, and red mud.

However, the former and the latter catalysts have unsolved problems mainly from the standpoints of catalyst deterioration and catalytic activity, respectively.

Recently, proposals have come to be made on techniques for efficiently conducting coal liquefaction in the method in which a catalyst is added to a coal slurry. These techniques comprise employing a catalyst having an increased functional-ingredient content, or comprise employing a catalyst having a reduced particle size so as to finely disperse the catalyst, each to thereby heighten the efficiency of the contact thereof with the coal and solvent. With respect to the case in which iron ore, iron hydroxide, red mud, iron sulfate or the like is used, it has been proposed to conduct the liquefaction reaction in the presence of sulfur to thereby greatly enhance the liquefaction activity. Naturally occurring pyrite is also well known to have catalytic activity. A process for chemically synthesizing a pyrite in order to heighten the content of $FeS_2$, serving as an active ingredient, is described, e.g., in Unexamined Published Japanese Patent Application No. 59-183831, which comprises using ferrous sulfate heptahydrate, sodium sulfide, and solid sulfur as starting materials to synthesize iron disulfide by a wet method. In this process, the iron disulfide yielded is taken out of the aqueous solution by filtration, washed, and then subjected to drying and pulverization steps.

Examined Japanese Patent Publication No. 61-60115 and Unexamined Published Japanese Patent Application No. 5-98266 proposed simplified processes in which ferrous sulfate is reacted as a starting material with hydrogen sulfide and elemental sulfur, respectively, as a sulfurizing agent at a high temperature by a dry method. A similar dry process is proposed in Unexamined Published Japanese Patent Application No. 61-268357, in which process the crystal water and adherent water of ferrous sulfate for use as a starting material are treated by drying, followed by burning at a high temperature with hydrogen sulfide and elemental sulfur.

However, the catalysts proposed so far are unsatisfactory in liquefaction yield when used in a system in which iron ore, iron hydroxide, red mud, iron sulfate or the like coexists with sulfur. Furthermore, it is known that use of prior art catalysts causes the deposition of a scale comprising mainly of iron compounds, on the inner surface of the tube of a preheater in a liquefaction plant, to thereby plug the flow path to arouse troubles in continuous operation. There also is a currently employed technique in which pyrite as a starting material is pulverized with a small-diameter ball mill or the like. However, since pyrite has a Mohs' hardness of 6 or higher, the balls or the main pulverizer body (rotor and stator) suffers considerable wear and should be replaced more frequently. Consequently, the particle size reduction of pyrite is limited, and the catalyst obtained cannot have a large surface area, resulting in a low liquefaction yield.

The catalyst synthesized by the wet process described above has drawbacks that the second step reaction, i.e., reaction between FeS and sulfur, takes much time because it is a solid-phase reaction, and that the catalyst contains ingredients other than iron disulfide, e.g., unreacted sulfur and Glauber's salt. Namely, this catalyst is still insufficient from the standpoints of hydrogenation activity and practical catalyst production, and is insufficient also in liquefaction efficiency.

The ferrous sulfate used as a starting material in the dry process disclosed in Examined Japanese Patent Publication No. 61-60115 is a 325-mesh pass (46 $\mu$m or smaller), while that used in Unexamined Published Japanese Patent Application No. 5-98266 has a particle diameter of from 8 to 15 $\mu$m. In the case where a 20-$\mu$m starting material, for example, is reacted in a fluidized burning furnace, the superficial velocity should be reduced to the 0.01 m/sec level for ensuring an in-furnace residence time necessary for obtaining a sufficient conversion. In industrial apparatuses, part of a sulfurizing agent is burned with air in order to supply heat of reaction. However, since the amount of air that can be introduced at such a low flow rate is limited, the result is either a reduced production rate or the necessity of heating from the outer wall of the furnace. If the superficial velocity is increased, for example, to 0.1 m/sec so as to increase productivity in the reaction of ferrous sulfate particles having a diameter in the above range, it is thought that the density of the fluidized bed decreases and the proportion of particles which go out through the furnace overhead nozzle (short-residence-time particles) increases, resulting in a reduced conversion and impaired suitability for disaggregation of product particles.

There is a strong desire for the economical production of a catalyst substance which has high liquefaction activity and is reduced in scale deposition in a preheater in a liquefaction plant, that is, which has a high $FeS_2$ content and a low content of Non-Catalytic components other than iron compounds and is capable of being dispersed as submicron particles having a sufficient surface area when used in coal liquefaction or in the hydrocracking reaction of a heavy oil.

The present invention has been achieved in order to provide an iron sulfide which exhibits excellent catalytic activity in hydrogenation when used in coal liquefaction or in the hydrocracking reaction of a heavy oil, and to provide an efficient process for producing the same. Because of the excellent catalytic activity in hydrogenation, it is possible to attain a high conversion of coal, a high yield of liquid, a high yield of light oil, and improvements in the quality of liquefied oil, such as a reduced content of heterocompounds, even when the catalyst is used in a discardable small amount.

DISCLOSURE OF THE INVENTION

The present inventors made extensive studies in order to develop a finely particulate high-purity iron sulfide. As a result, they have found that synthesized compounds comprising iron disulfide as a main component and made up of submicron primary particles exhibit excellent catalytic activity in hydrogenation when used, for example, as a catalyst for coal liquefaction. The present invention has been completed based on this finding.

The present invention provides:

(1) An iron sulfide characterized in that it comprises from 85 to 100 wt % $FeS_2$, from 5 to 10 wt % $Fe_{1-x}S$ (X:0 to 0.2), from 5 to 0 wt % $Fe_3O_4$ and from 10 to 0 wt % $FeSO_4$ as determined by X-ray diffractometry, and that the secondary particles thereof each formed from primary particles having a particle diameter of from 10 to 400 nm have a 50% volume-cumulative particle diameter of from 20 to 300 μm; and (2) A process for producing an iron sulfide characterized by comprising introducing (a) an iron sulfate comprising, as a main component, ferrous sulfate monohydrate having a $d_{50}$ of from 20 to 300 μm and (b) not less than stoichiometric amount of at least one sulfur compound selected from elemental sulfur in a powder, melt or vapor state and hydrogen sulfide into the fluidized bed zone of a fluidized burning furnace and then fluidizing, burning, and reacting the ingredients at a temperature of from 350 to 630° C., excluding 630° C., a superficial velocity of 0.1 m/sec or higher, and a pressure of 1 atm or higher using air as a fluidizing gas for supplying heat necessary for maintaining the reaction temperature by sulfur combustion.

BEST MODES FOR CARRYING OUT THE INVENTION

The particulate iron sulfate for use in the present invention comprises ferrous sulfate monohydrate as a main component. Industrially, the iron sulfate is obtained from the ferrous sulfate contained in the waste acid resulting from the washing of steel products with sulfuric acid or contained in a by-product liquid yielded in titanium oxide production or from the ferrous sulfate obtained by dissolving an iron scrap or iron ore in sulfuric acid, by crystallizing the ferrous sulfate at ordinary temperature to obtain the heptahydrate thereof and heating the heptahydrate to convert the same to the monohydrate, or by crystallizing the ferrous sulfate at a temperature not lower than 64° C. and drying the crystallized compound. The iron sulfate used as an iron ingredient need not be pure, and may contain sulfates of nickel, cobalt, molybdenum, manganese, etc. The content of free water therein is 0.5 wt % or lower, desirably 0.1 wt % or lower. Too high free-water contents are undesirable in that not only the burning reaction has an increased thermal load because of the vaporization of water, but also the iron sulfate shows enhanced adhesion during storage and transportation by gas flow to thereby have poor handleability. In the following explanation, this iron sulfate is called ferrous sulfate monohydrate.

Figure 1:
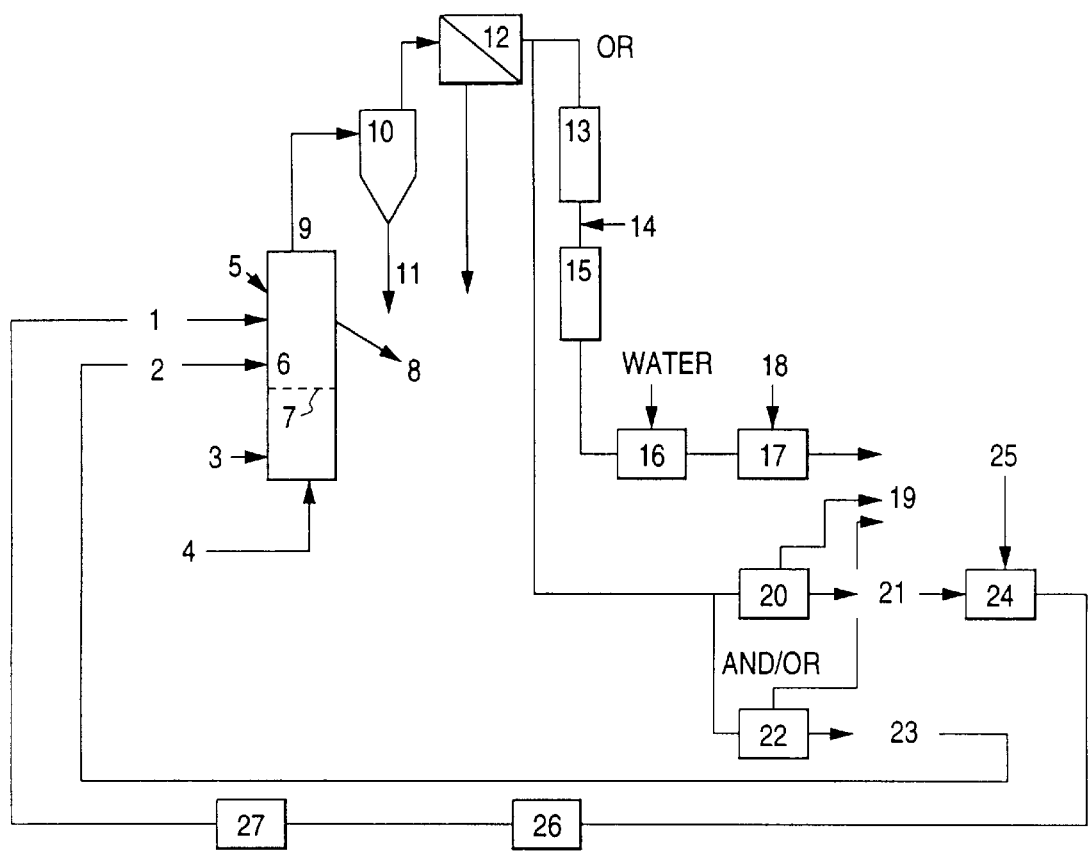
FIG. 1 is a flowchart illustrating one embodiment for carrying out the present invention.

FIG. 1 is a flowchart illustrating one embodiment of the process for producing the iron sulfide of the present invention. This process is explained in detail. A fluidized burning furnace 5 is used which has a perforated plate 7 inside and a fluidized bed 6 formed on the plate 7. Air supplied through an air supply line 3 is used as a fluidizing gas. To the fluidized bed 6 are fed ferrous sulfate monohydrate through feed line therefor 1 and either elemental sulfur or hydrogen sulfide through a supply line therefor 2. In the case of using powdery sulfur, the powdery sulfur and ferrous sulfate monohydrate may be mixed with each other and supplied through the same supply line.

Part of the iron sulfide particles yielded in the fluidized bed 6 flow out through an overflow nozzle 8, while the remainder goes out through a furnace overhead nozzle 9 and enters a cyclone 10. The iron sulfide particles separated in the cyclone 10 go out through a bottom part thereof as an underflow 11. The remaining particles are separated by means of a dust-collecting apparatus 12 selected from an electrostatic precipitator, a bag filter, a ceramic filter and a filter packed with particles. The gas is sent to a sulfuric acid production unit 20 and/or a sulfur recovery apparatus 22, or is discharged via a waste gas heater 13, a burning device 15, a scrubber 16 and a neutralizing device 17. Before the burning device 15, heated air 14 is added. In the scrubber 16, the gas is scrubbed with water. In the neutralizing device 17, to which an alkali solution is continuously supplied through a supply line therefor 18, the acid components contained in the gas are removed. The residual gas is then discharged.

The sulfuric acid 21 produced in the sulfuric acid production unit 20 is sent to an iron sulfate production unit 24 together with an iron source 25, e.g., an iron scrap or iron ore, to obtain ferrous sulfate heptahydrate, which is then sent to a ferrous sulfate dryer 26. The ferrous sulfate heptahydrate is dehydrated and dried in the dryer 26 to convert the main component to ferrous sulfate monohydrate, and is then sent to a pulverizer 27.

The sulfur 23 recovered in the sulfur recovery apparatus 22 is sent to the supply line 2 for sulfur or hydrogen sulfide.

The sulfurizing agent for use in the present invention may be either elemental sulfur or hydrogen sulfide. The elemental sulfur may be in any of solid, liquid (melt), and vapor states. The elemental sulfur and the sulfur compound are not only used as a sulfurizing agent, but also used, after having been burned with air, for preheating necessary for the reaction or supplying heat of reaction. Consequently, elemental sulfur or hydrogen sulfide should be supplied to the fluidized burning furnace 5 in such a manner that it is uniformly dispersed over the perforated plate 7 in the fluidized burning furnace 5.

The fluidized burning furnace 5 used is of the fluidized bed type having in a bottom part thereof either a perforated plate 7 or nozzles for dispersing air. The air serving as a fluidizing gas is introduced so as to pass through the perforated plate or introduced with nozzles, while ferrous sulfate monohydrate and sulfur are fed through at least one nozzle located above the perforated plate 7 so that the materials are uniformly dispersed in the radial direction in the furnace. The reaction proceeds mainly in the fluidized bed 6 formed. Part of the reaction product is withdrawn by means of a screw feeder or the like through at least one overflow nozzle 8 disposed above the fluidized bed 6. The particles which have flown out of the fluidized bed 6 ascend through the freeboard part, i.e., an upper part of the fluidized burning furnace 5, and go out of the furnace together with the discharge gas through the furnace overhead nozzle 9 disposed at the top of the furnace. The fluidized burning furnace 5 may suitably have a nozzle for temperature and pressure measurement, not shown in the figure.

The fluidization and the burning reaction are controlled by regulating the amount of air for combustion, the amount of ferrous sulfate monohydrate or the amount of sulfur. In order to supply the quantity of heat necessary for dehydrating the ferrous sulfate hydrate and for the reduction thereof with sulfur (endothermic) by means of the oxidation reaction of sulfur caused by combustion with air, and in order to avoid local overheating within the fluidized bed 6, the fluidized bed 6 is preferably a dense layer. In order for the fluidized bed 6 to be practical, it is an expanded layer. The oxygen contained in the air is consumed by sulfur combustion and by the subsequent combustion of the resultant sulfides. The content of residual oxygen in the discharge gas as determined at the outlet of the fluidized burning furnace 5 is almost zero. The higher the reaction temperature, the higher the reaction rate. However, since sintering occurs among particles of the reaction product or among constituent primary particles thereof, the reaction temperature is desirably below 640° C., which is the fusion temperature of pure $FeS_2$, in particular from 350° C. to 630° C., excluding 630° C., and desirably from 450 to 550° C. The temperature used here means the reading of a thermometer inserted into the fluidized bed 6.

The minimum value of the amount of the sulfurizing agent used for ferrous sulfate monohydrate is equal to the total of the amount of combustion sulfur corresponding to the quantity of heat used for preheating to the reaction temperature, the quantity of heat of reaction (endothermic), and the quantity of heat used for compensating heat loss and the amount of sulfur for reaction (i.e., the difference in sulfur content between all reaction products and ferrous sulfate monohydrate). However, from the standpoint of avoiding sintering of the reaction product, it is preferred to regulate the amount of sulfur for reaction with ferrous sulfate monohydrate, i.e., the S/Fe molar ratio, to a value larger than the stoichiometric amount by from 0 to 100%, desirably from 3 to 20%.

In order to form within the fluidized burning furnace 5 a sound fluidized bed 6 free from channeling, segregation, or slugging, it is important to select proper values of the particle diameter of ferrous sulfate monohydrate and of superficial velocity.

The reasons therefor are as follows. A reduction in particle diameter results in an increase in particle surface area, i.e., an enlarged surface for reaction, so that the reaction rate in the fluidized bed 6 can be heightened. However, particles having too small a diameter more tend to adhere to one another and to aggregate and are apt to cause channeling, making it difficult to form a stable fluidized bed 6. Ferrous sulfate monohydrate has Rosin-Rammler's particle size distribution. However, if an appropriate superficial velocity suitable for the formation of a sound fluidized bed 6 is not selected, smaller particles having a terminal velocity lower than that velocity pass by the freeboard and go out of the furnace through the furnace overhead nozzle 9 together with a fluid gas. Consequently, a sufficient in-furnace residence time is not obtained, resulting in an increased amount of insufficiently reacted reaction products. Although this may be avoided by using particles having an increased diameter, the following has been generally thought. Such particles disaggregate into smaller particles as a result of the dehydration of ferrous sulfate monohydrate by rapid heating and the reaction of ferrous sulfate with sulfur with discharge of $SO_2$ gas. Even though part of the particles resulting from disaggregation can enlarge as a result of adhesion to one another, aggregation, sintering, fluidized bed granulation, etc., most of the particles go out through the furnace overhead nozzle 9 and the main reaction product cannot be obtained through the overflow nozzle 8 of the fluidized burning furnace 5.

However, according to the present invention, the reaction product obtained from ferrous sulfate monohydrate under the aforementioned conditions with respect to the drying of the ferrous sulfate monohydrate, reaction temperature, S/Fe ratio, and superficial velocity surprisingly retains the almost intact particle diameter distribution of the ferrous sulfate monohydrate and comprises secondary particles which can be reduced into small particles of 5 μm or smaller upon application of slight disaggregating force thereto.

Since the reaction product (secondary particles) obtained according to the present invention retains the almost intact particle diameter distribution of the ferrous sulfate monohydrate as stated above, the $d_{50}$ thereof is from 20 to 300 μm, preferably from 50 to 200 μm, more preferably from 100 to 200 μm. In particular, the reaction product taken out through the overflow nozzle 8 has almost the same particle diameter distribution ($d_{50}$) as the ferrous sulfate monohydrate, as will be demonstrated by Examples.

The primary particles of the reaction product have a particle diameter of from 10 to 400 nm, and most of these have a diameter of about from 25 to 200 nm as will be shown in Examples.

In the present invention, a method has been found in which the $d_{50}$ of ferrous sulfate monohydrate is regulated to a value which facilitates the formation of a sound fluidized bed 6, i.e., from 20 to 300 μm, and a superficial velocity suitable for the $d_{50}$ is selected. Specifically, the superficial velocity for the average particle diameters of from 20 to 300 μm is 0.1 m/sec or higher. The superficial velocity for the preferred average particle diameters of from 50 to 200 μm is from 0.2 to 2 m/sec, and that for the more preferred average particle diameters of from 100 to 200 μm is from 0.3 to 0.8 m/sec.

The ferrous sulfate monohydrate particles having a $d_{50}$ of from 20 to 300 μm for use as a starting material in the process described above are obtained by dehydrating and drying ferrous sulfate heptahydrate to obtain a lump, pulverizing the lump with a hammer mill or the like, and collecting particles 0% of which do not pass through a 42-mesh (Tyler sieve) sieve and 1% of which do not pass through a 60-mesh sieve.

The particle size distribution is determined, for example, by laser refractometry.

If desired and necessary, an inert gas, e.g., nitrogen, or a recycled discharge gas containing $SO_2$ can be added to the air for combustion, in order to regulate the superficial velocity.

By regulating the ferrous sulfate monohydrate and the reaction product so as to have an increased particle diameter, they are reduced in the adhering and aggregating property inherent in fine particles and can be extremely easily discharged from a storage tank, metered, and transported by gas flow. Namely, difficulties in particle discharge from a storage tank due to compaction, inversely the formation of a rathole which results in the blow-by of the seal gas in the storage tank through a lower nozzle, and clogging troubles in metering devices, e.g., a table feeder, and in gas flow transport pipes due to the adhesion of particles are diminished markedly.

The reaction time for the reaction product obtained through the overflow nozzle 8 is equal to the residence time of the reactants in the fluidized bed 6 {(volume of the space ranging from the perforated plate 7 to the overflow nozzle 8)÷(average density of the fluidized bed)÷(weight rate of reaction product withdrawal)}, while the reaction time for the reaction product obtained through the furnace overhead nozzle 9 is equal to the residence time of the particles {(length of the furnace)÷(superficial velocity)}. Both reaction times are governed by superficial velocity. The proportion of the reaction product going out through the overflow nozzle 8 to that going out through the furnace overhead nozzle 9 depends on particle size and distribution thereof.

The particles which accompany a discharge gas and leave the fluidized burning furnace 5 through the furnace overhead nozzle 9 are introduced into the cyclone 10, and the particles collected are taken out through an underflow 11. Partly returning the particles thus taken out to the fluidized burning furnace 5 is effective in improving the $FeS_2$ purity of the target product. For this purpose, the cyclone 10 may be installed inside the fluidized burning furnace 5. The cyclone 10 should be kept at a temperature at which the sulfur contained in the discharge gas does not condense and which is not lower than the dew point for the acid components, desirably at a temperature of 300° C. or higher, by means of insulation, etc.

The discharge gas which has left the overflow nozzle of the cyclone 10 is introduced into a dust-collecting apparatus 12 selected from an electrostatic precipitator, a bag filter, a ceramic filter, a filter packed with particles, and the like to thereby collect the remaining particles. The apparatus 12 is preferably operated at a temperature of 300° C. or higher like the cyclone 10. Although an electrostatic precipitator having a low pressure loss is desirable from the standpoint of keeping the operation pressure of the whole system low, the internal pressure of the electrostatic precipitator is desirably not lower than the atmospheric pressure from the standpoint of avoiding combustion of sulfides on a dust-collecting plate and dust explosion which are caused by air leakage into the apparatus.

The concentration of particles in the discharge gas leaving the dust-collecting apparatus 12 may be regulated according to the method for the subsequent treatment of the discharge gas. In the case where the acid components contained in the discharge gas are to be recovered as sulfuric acid after oxidation or as elemental sulfur after reduction, the concentration of particles should be reduced to a level at which each reactor is prevented from suffering the pressure increase caused by particle accumulation on the catalyst layer. In an electrostatic precipitator, the outlet particle density is governed by the number of dust-collecting plates, applied voltage, etc. In some cases, one of the oxidation or reduction catalyst layers is used as a particle-packed filter layer to remove particles.

In the case where the discharge gas is cooled to a temperature not higher than the condensation temperature of sulfur, for example, by a method in which the discharge gas is rapidly quenched, e.g., with water and then neutralized, the unreacted sulfur vapor remaining in the discharge gas may adhere to or deposit on the quenching apparatus and the wall of the subsequent piping to cause flow path plugging in cooperation with particles remaining in a slight amount. Consequently, burning the unreacted sulfur with air, i.e., conversion to $SO_2$ or $SO_3$, is effective in removing the sulfur beforehand. The combustion temperature is 300° C. or higher, desirably 500° C. or higher, and the percentage of excess air is 50% or higher, desirably 100% or higher. In order to attain close contact between air and the discharge gas, the combustion chamber 15 has a structure in which air is blown into the chamber through a multihole nozzle at a high speed and which has a gas residence time of 1 second or longer, desirably 2 seconds or longer, and contains an appropriate baffle plate for preventing the gas from short-circuit. A flame holder may be disposed in the combustion chamber 15 if desired; this is also an effective means.

In the case where the oxidation or reduction treatment is conducted at a temperature not lower than the dew point for sulfur, the combustion treatment can be omitted.

The acid components contained in the discharge gas are oxidized in a known manner and recovered as sulfuric acid. The sulfuric acid recovered is used as an industrial chemical. This sulfuric acid and an iron source 25, e.g., scrap iron or iron ore, are converted to ferrous sulfate monohydrate through dissolution, crystallization, drying, and pulverization steps, and the ferrous sulfate monohydrate is used as a starting material for burning and/or reaction in the present invention. For removing the crystal water of the heptahydrate or for drying the iron compound for removing the adherent water, a known means may be used, such as a kiln type rotary dryer.

The acid components contained in the discharge gas are recovered as a reduction product, i.e., elemental sulfur, by a known method, e.g., the Claus process or Scott process. In the case where the production of the target product is conducted on the same location as coal liquefaction, heavy-oil hydrogenation, or the like, the hydrogen sulfide and hydrogen generated in these plants can be used to facilitate the reduction operation.

The iron sulfide of the present invention is collected through the overflow nozzle 8 of the fluidized burning furnace 5, from the cyclone 10, and in the dust-collecting apparatus 12, respectively, as secondary particles having a $d_{50}$ of 200 μm or smaller, secondary particles having a $d_{50}$ of 100 μm or smaller, and secondary particles having a $d_{50}$ of 25 μm or smaller. The iron sulfide therefore is free from dusting of fine particles, adhesion, aggregation, etc. in storage, transportation, or packaging, and can be easily handled. In the final use, for example, in the case where the iron sulfide of the present invention is transported as a slurry, the iron sulfide can be reduced by a simple disaggregation operation into particles having a $d_{50}$ of 5 μm or smaller, and even to a submicron level, in order to prevent settling during transportation.

Generally used methods for disaggregating the secondary particles include a dry disaggregation method using a jet mill to utilize interparticulate collisions caused by a high-speed inert gas, and a wet disaggregation method which comprises ultrasonic dispersion in an alcohol or a hydrocarbon oil, or which comprises high-shear dispersion with a homomixer or the like. There is no need of using a pulverizer which requires a large amount of energy and suffers considerable wear, such as a wet ball mill or a bead mill. Since iron sulfide readily oxidizes upon contact with air and dissolves in water, it is undesirable to use air or water as a medium. The primary particles have a rounded shape.

The particles obtained by disaggregating the iron sulfide of the present invention which have a d50 of 5 μm or smaller or on a submicron level are especially suitable for use as a catalyst for coal liquefaction or the hydrocracking reaction of a heavy oil.

In the case where the iron sulfide of the present invention is used as a catalyst to conduct, e.g., the liquefaction reaction of a coal, the kind of the coal is not particularly limited. Coals of all grades can be used, such as anthracite, bituminous coal, subbituminous coal, brown coal, peat, and mixtures thereof. A coal is pulverized to particles having a desired particle diameter range, usually from 50- to 400-mesh (Tyler sieve) particles, and dried, before being used. As a solvent is generally used part of the liquefaction product oils yielded in a coal liquefaction process, e.g., an intermediate fraction having a boiling point range of from 200 to 500° C. The solvent/coal weight ratio is usually selected from the range of from 1 to 4 to prepare a flowable slurry feedstock. In place of or in addition to these, any solvent capable of donating and transferring hydrogen and of recombining with hydrogen can be used in the present invention. Examples thereof include tetralin, hydrogenated or unhydrogenated creosote oil, and anthracene oil. The hydrogen-donating solvent can be replaced with a petroleum heavy oil or bitumen (oil sand oil).

This means that the catalyst can be used not only for the liquefaction of coals, but also for the hydrocracking of heavy oils and for the so-called co-processing, in which the two processes are conducted simultaneously. The heavy oil hydrocracking or the co-processing is basically a one-through reaction and can be conducted without the necessity of a solvent-circulating step. There are hence advantages of a high volume efficiency of the process, simplified equipment, etc.

Although the amount of the catalyst added to the slurry feedstock is influenced by the kind of coal, the kind of solvent, the degree of coal liquefaction reaction, the type of coal liquefaction reactor, etc., it may be usually selected so that the content thereof in the slurry feedstock is in the range of from 0.01 to 2% (by weight) in terms of iron amount.

It is a matter of course that the catalyst may be used in an amount larger than the amount specified above, in order to further modify the properties of liquefaction product oils by enhancing a desired function, e.g., the hydrogenation of the liquefaction product oils or the elimination of heteroatoms from the liquefaction product oils.

The slurry feedstock to which the catalyst has been added is mixed with either hydrogen or a hydrogen-containing gas to conduct a coal liquefaction reaction at a high temperature and a high pressure. The liquefaction reaction can be carried out either batch-wise or continuously. Conditions for the liquefaction reaction can be selected from known ranges. Namely, a reaction temperature is selected from the range of from 400 to 480° C., a reaction time is selected from the range of from 30 minutes to 2 hours based on the volume of the slurry feedstock, and a hydrogen pressure is selected from the range of from 100 to 300 kg/cm$^2$. It is advantageous that hydrogen or a hydrogen-containing gas is fed in such an amount that the three phases, i.e., the gas, liquid, and solid phases, are sufficiently mixed according to the reactor used. In a generally employed method, hydrogen or a hydrogen-containing gas is fed in a hydrogen amount selected from the range of about from 300 to 2,000 Nm$^3$/kl of the slurry feedstock, and the gas fed is recycled after being replenished in an amount corresponding to the consumed hydrogen amount.

However, these liquefaction reaction conditions need not be strictly within those ranges. The conditions do not independently have proper values, but correlate with one another. Consequently, the preferred ranges of individual conditions are influenced by the combination thereof. Any type of continuous liquefaction reactor, e.g., a tower type or a vessel type, may be employed without particular limitations, as long as it can be used for carrying out the slurry reaction. In general, the reactor has a preheating region and a reaction region.

Since the reaction products going out of the liquefaction reaction zone are in a three-phase state comprising gas, liquid, and solid phases, they each are separated and recovered. The gas phase comprises unreacted hydrogen and yielded gases (gases comprising $C_1$–$C_4$ hydrocarbons and heteroatom gases such as $H_2S$, CO, $CO_2$, and $NH_3$). The unreacted hydrogen recovered is recycled to the liquefaction reactor. The solid phase mainly comprises unreacted coal, ash, and a small amount of the catalyst. The liquid phase comprises liquid oils comprising coal liquefaction product oils containing a solvent. The liquid oils are usually fractionated into various grades with a distillation tower and then recovered.

EXAMPLES

The present invention will be explained below in more detail by reference to Examples, but the invention should not be construed as being limited to these Examples in any way.

The ferrous sulfate heptahydrate and elemental sulfur used in the following Examples and Comparative Examples were commercial ones. For analysis for components including sulfides, X-ray diffractometry was used with (Type RINT 1100) manufactured by Rigaku-sha. For particle size measurement, laser diffractometry was used with (Type MS-24) manufactured by Seishin Kigyo.

$d_{50}$ means a 50% volume-cumulative particle diameter as determined from an examination of a dispersion obtained by dispersing a sample for particle size measurement in isopropyl alcohol. $d_{50}'$ means a 50% volume-cumulative particle diameter as determined from an examination made immediately after 25-W ultrasonic waves are applied for 5 minutes to the dispersion placed in a beaker.

A scanning electron microscope (SEM) manufactured by Hitachi Ltd. (Type S-960) was used.

Example 1

Ferrous sulfate heptahydrate was treated with a kiln type dehydrating dryer to obtain ferrous sulfate monohydrate having an adherent water content of 0.1 wt %. Thereafter, the ferrous sulfate monohydrate was pulverized with a hammer mill to obtain a powder 0% of which did not pass through a 42-mesh (Tyler sieve) sieve and 1% of which did not pass through a 60-mesh sieve. This powder was used as a starting material. The starting material had a $d_{50}$ (average diameter) as determined by laser diffractometry of 160 μm. This ferrous sulfate monohydrate and a powder of elemental sulfur having an average particle diameter of 30 μm were fed with feeders at rates of 1.86 kg/hr and 1.59 kg/hr, respectively, to a stainless-steel fluidized burning furnace 5 which was kept at 500° C., had an inner diameter of 100 mm and a height of 3,000 mm, had in a bottom part thereof a perforated plate 7 having a rate of opening area of 0.27%, and was thermally insulated outside. From the furnace bottom, 500° C. air and nitrogen gas were blown as a fluidizing gas into the furnace at rates of 1.9 Nm$^3$, respectively, in such a manner as to result in a superficial velocity of 0.4 m/sec.

Product particles were collected through an overflow nozzle 8 disposed at a height of 1,000 mm above the perforated plate at a rate of 0.7 kg/hr, and particles contained in the discharge gas which had passed through a furnace overhead nozzle 9 and been introduced into a cyclone 10 having a diameter of 50 mm were collected through a cyclone underflow 11 at a rate of 0.5 kg/hr. Thus, black powders were obtained. The discharge gas went out of the cyclone 10 through the overflow thereof, passed through a bag filter (dust-collecting apparatus) 12, and was then released, during which period the powder collected by the bag filter 12 over 9 hours amounted to 0.1 kg.

Figure 2:
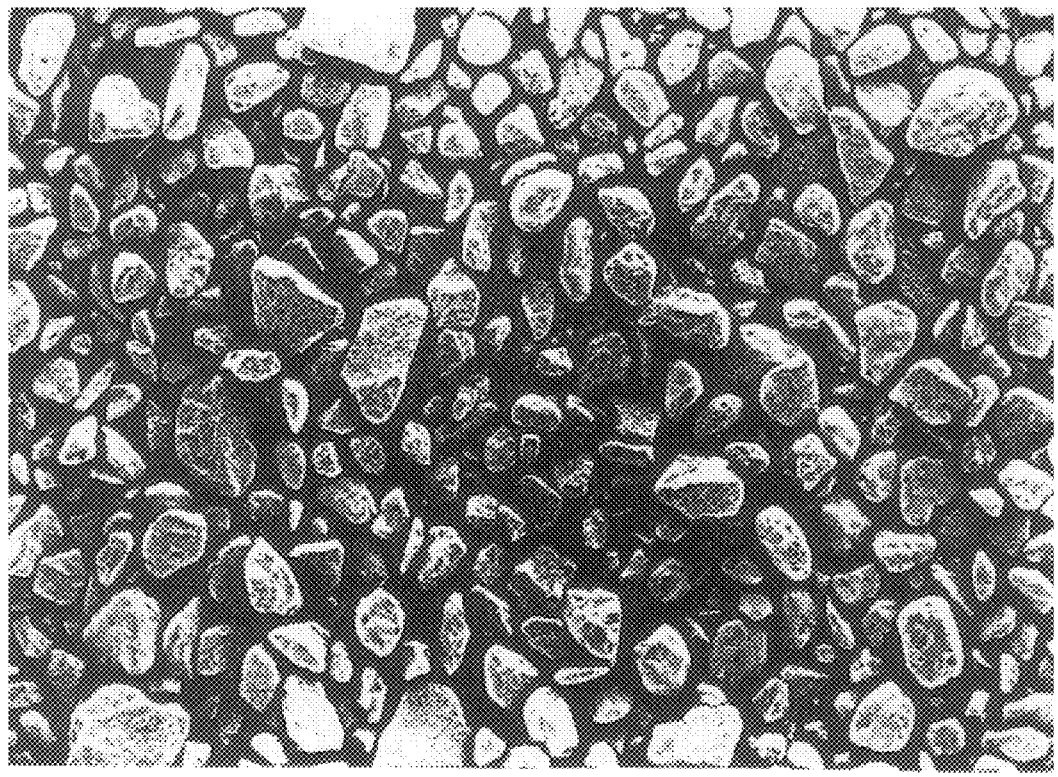
FIG. 2 is an electron photomicrograph of secondary particles of the iron sulfide of the present invention.
Figure 3:
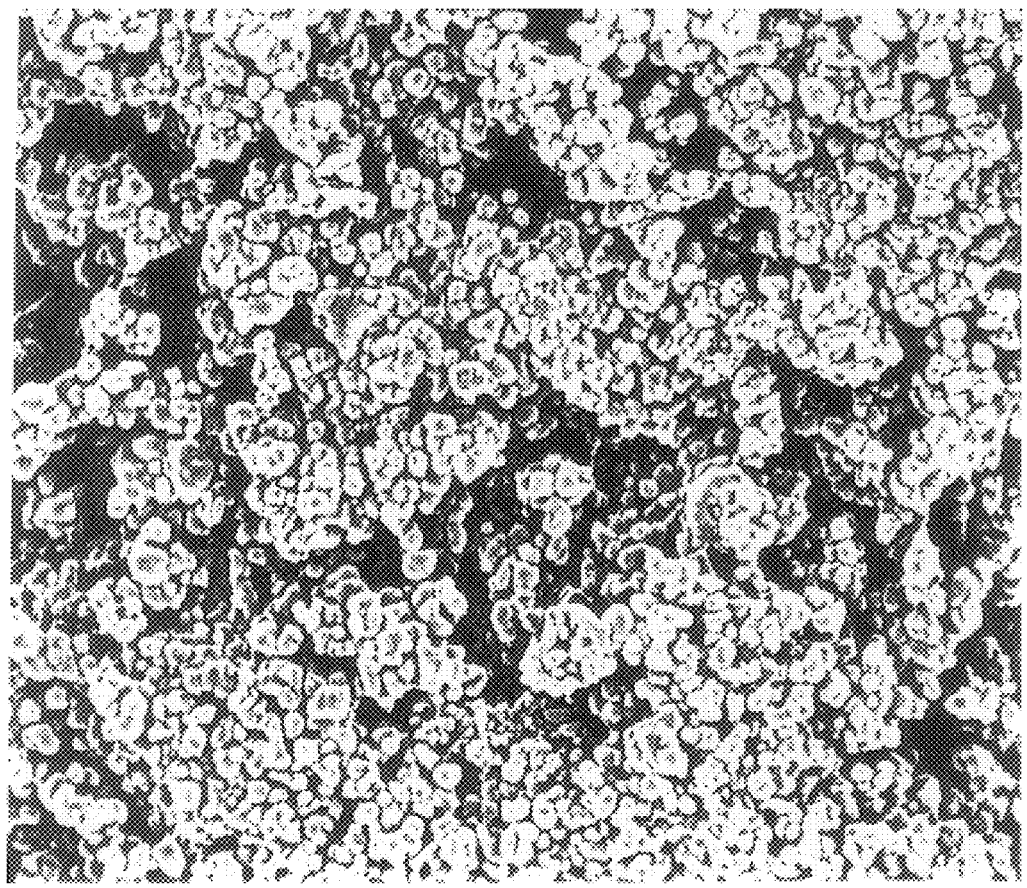
FIG. 3 is an electron photomicrograph of the secondary particles taken at a higher magnification.

In Table 1 are given the results of the examination of each reaction product for components and particle diameter. Photographs taken with an SEM are shown in FIGS. 2, 3, and 4.

Figure 4:
FIG. 4 is an electron photomicrograph showing disaggregated secondary particles.

FIG. 4 is a view illustrating particles which were examined after application of ultrasonic waves thereto. The particles shown had reduced sizes as a result of disaggregation of secondary particles. The $d_{50}'$ given in Table 1 means the average particle diameter of the disaggregated particles.

TABLE 1

| Particle collection place | Components (wt %) | | | | | Particle diameter ($\mu$m) | | Particle diameter of primary particles, determined with SEM (nm) |
|---|---|---|---|---|---|---|---|---|
| | $FeS_2$ | $Fe_{1-x}S$ | $Fe_3O_4$ | $FeSO_4$ | S | $d_{50}$ | $d_{50}'$ | |
| Overflow nozzle | 98 | 2 | 0 | 0 | 0 | 157 | 0.42 | 25–150 |
| Cyclone underflow | 91 | 4 | 0 | 5 | 0 | 64 | 0.43 | 25–200 |

The reaction products contained no unreacted elemental sulfur, and at least 98.7% of the ferrous sulfate had been sulfurized to $FeS_2$ and $Fe_{1-x}S$. No $Fe_3O_4$ was detected, which results from oxidation of the sulfides. The reason why the cyclone underflow powder contained $FeSO_4$ and $Fe_{1-x}S$ in larger amounts may be that the powder had resided in the fluidized bed 6 for a shorter time and had been in a lower degree of contact with sulfur than the overflow powder. As shown by the values of $d_{50}'$, the reaction products were easily reduced into submicron particles by an ultrasonic treatment.

As shown in FIG. 2, the secondary particles had an irregular rounded shape.

Examples 2 to 4

The same procedure as in Example 1 was conducted, except that the temperature, sulfur amount, and superficial velocity were changed. The results shown in Table 2 were obtained. The increased superficial velocity was obtained by additionally adding nitrogen gas without changing the air amount. The contents of $Fe_3O_4$ and S are not shown in the Table because these were not detected.

TABLE 2

| Example | Temperature (° C.) | Sulfur amount (kg/h) | Superficial velocity (m/sec) | Particle collection place | Collected amount (kg/h) | Components (wt %) | | | Diameter ($\mu$m) | | Particle diameter of particles, determined with SEM (nm) |
|---|---|---|---|---|---|---|---|---|---|---|---|
| | | | | | | $FeS_2$ | $Fe_{1-x}S$ | $FeSO_4$ | $d_{50}$ | $d_{50}'$ | |
| 2 | 600 | 1.59 | 0.40 | overflow nozzle | 0.59 | 98 | 2 | 0 | 160 | 0.48 | 30–100 |
| | | | | cyclone underflow | 0.51 | 93 | 3 | 4 | 68 | 0.47 | 25–200 |
| 3 | 540 | 1.75 | 0.40 | overflow nozzle | 0.60 | 99 | 1 | 0 | 150 | 0.32 | 25–150 |
| | | | | cyclone underflow | 0.50 | 94 | 3 | 3 | 64 | 0.35 | 25–200 |
| 4 | 500 | 1.59 | 0.20 | overflow nozzle | 0.75 | 98 | 2 | 0 | 145 | 0.45 | 25–150 |
| | | | | cyclone underflow | 0.25 | 94 | 4 | 2 | 40 | 0.46 | 25–200 |

In FIG. 3 are shown enlarged typical secondary particles. The secondary particles each was an aggregate of rounded primary particles of about from 25 to 150 nm. However, as seen in this Figure, some secondary particles had unclear boundaries among constituent particles, with primary particles being seemingly embedded in others.

Example 5

The same procedure as in Example 1 was conducted, except that the sulfur amount was changed to 1.80 kg/hr and that all the cyclone underflow 11 was returned to the bottom part of the fluidized burning furnace 5. As a result, 0.1 kg of a powder was recovered from the bag filter 12 in 4 hours, and all the other reaction product was recovered through the overflow nozzle 8 and amounted to 4.8 kg in 4 hours.

TABLE 3

| Particle collection place | Components (wt %) | | | Particle diameter ($\mu$m) | | Particle diameter of primary particles, determined with SEM (nm) |
|---|---|---|---|---|---|---|
| | $FeS_2$ | $Fe_{1-x}S$ | $FeSO_4$ | $d_{50}$ | $d_{50}'$ | |
| Overflow nozzle | 100 | 0 | 0 | 110 | 0.40 | 25–150 |

Example 6

Ferrous sulfate monohydrate and elemental sulfur were metered respectively with constant volumetric feeders to a fluidized burning furnace 5 made of steel which had a diameter of 300 mm and a height of 5,000 mm, had in a bottom part thereof a perforated plate 7 having a rate of opening area of 0.27%, and was lined with refractory bricks, at feed rates of 16.7 kg/hr and 14.2 kg/hr, respectively, by means of transportation by a flow of an inert gas. Through nozzles located below the perforated plate, air and nitrogen, heated to 500° C., were blown as a fluidizing gas into the furnace at rates of 17 Nm³/hr and 12 Nm³/hr, respectively.

The furnace had three thermometers arranged at the same interval between the perforated plate 7 and an overflow nozzle 8 located at a height of 1,000 mm above the perforated plate, and the differences among the readings of these thermometers were within 3° C. The discharge gas was introduced via a furnace overhead nozzle 9 into a cyclone 10 having a diameter of 160 mm. After particles were separated out through an underflow 11, the gas was introduced via an overflow nozzle of the cyclone into an electrostatic precipitator (dust-collecting device) 12 having thirty dust-collecting plates to which a voltage of 10,000 V was being applied. The particles collected by the dust-collecting plates were knocked off the plates with a hammer, gathered on the bottom of the electrostatic precipitator 12, and then discharged with a screw feeder. The results of the analyses of the particles obtained through the overflow nozzle 8 and those obtained from the cyclone 10 are shown in Table 4.

TABLE 4

| Particle collection place | Collected amount (kg/h) | Components (wt %) | | | Particle diameter ($\mu$m) | |
|---|---|---|---|---|---|---|
| | | $FeS_2$ | $Fe_{1-x}S$ | $FeSO_4$ | $d_{50}$ | $d_{50}'$ |
| Overflow nozzle | 6.5 | 97 | 3 | 0 | 157 | 0.34 |
| Cyclone underflow | 4.7 | 92 | 4 | 4 | 64 | 0.41 |
| Electrostatic precipitator | 0.1 | 81 | 7 | 12 | 7.5 | 7.1 |

The reason why the particles collected with the electrostatic precipitator 12 had a low $FeS_2$ content may be that smaller particles of the ferrous sulfate monohydrate used as a starting material went out of the furnace without sufficiently residing in the fluidized bed 6 of the fluidized burning furnace 5 and without undergoing reaction. The reason why those particles were not disaggregated by ultrasonic application may be that because of the low degree of sulfurization, the property of being not disaggregated by an ultrasonic treatment, which is inherent in the starting ferrous sulfate monohydrate, was retained.

Comparative Example 1

Iron disulfide was synthesized by the method described in Unexamined Published Japanese Patent Application No. 59-183831. Namely, ferrous sulfate heptahydrate, sodium sulfide, and solid sulfur were used as starting materials to synthesize iron disulfide by a wet process. The resultant slurried powder was washed, filtered, dried, and then pulverized with a ball mill to obtain the following.

| | | | |
|---|---|---|---|
| $FeS_2$ | 85 wt % | $d_{50}$ | = 8.1 $\mu$m |
| $FeSO_4$ | 0 wt % | $d_{50}'$ | = 4.1 $\mu$m |
| Sulfur | 11 wt % | | |
| $Na_2SO_4$ and others | 4 wt % | | |

Sulfur removal was attempted by the following method. However, complete sulfur removal was difficult.

| Method for Removal | Sulfur Content (wt %) | Degree of Removal (%) |
|---|---|---|
| Washing with 105° C. hot water | 10.2 | 7% |
| Washing with $CS_2$ thrice (S/$CS_2$ = 3) | 5.7 | 48% |
| Washing with $CHCl_3$ thrice (S/$CCl_3$H = 3) | 7.5 | 32% |
| Passing 250° C. nitrogen gas | 3.6 | 67% |

Comparative Example 2

A test was conducted under the same conditions as in Example 1, except that the adherent water content of ferrous sulfate monohydrate was regulated to 1.5 wt % and the ferrous sulfate monohydrate was pulverized to an average particle diameter of 18 $\mu$m. Black powders were collected through the overflow nozzle 8 at a rate of 0.25 kg/hr and through the cyclone underflow 11 at a rate of 0.75 kg/hr. The amount of the powder collected with the bag filter (dust-collecting apparatus) 12 in 8 hours was 0.1 kg. The results of the analyses of the powder obtained through the overflow nozzle 8 and that obtained through the cyclone underflow 11 are shown in Table 5.

TABLE 5

| Particle collection place | Components (wt %) | | | | | Particle diameter ($\mu$m) | |
|---|---|---|---|---|---|---|---|
| | $FeS_2$ | $Fe_{1-x}S$ | $Fe_3O_4$ | $FeSO_4$ | S | $d_{50}$ | $d_{50}'$ |
| Overflow nozzle | 84 | 4 | 3 | 9 | 0 | 46 | 26 |
| Cyclone underflow | 79 | 3 | 4 | 14 | 0 | 22 | 19 |

The powders obtained each contained a large amount of unreacted $FeSO_4$, and the $d_{50}'$ thereof was not submicron.

Comparative Example 3

Natural pyrite yielded in Hanaoka Mine, Okayama Prefecture in Japan was pulverized to 74 $\mu$m, dried, and then converted to a 40% slurry in creosote oil. A horizontal wet ball mill which had a treating capacity of 5-kg slurry per hour and in which a cylinder packed with Cr steel balls with a diameter of 10 mm and equipped with stirring means and an outer cylinder containing balls were rotated in opposite directions was used to pulverize the slurried pyrite to obtain the particles shown in Table 6. The components were determined by chemical analysis. The particle diameters were determined by laser diffractometry using the slurries as they were.

TABLE 6

| Components (wt %) | | | | Particle diameter (μm) | | Examination |
|---|---|---|---|---|---|---|
| Fe | S | $SiO_2$ | Others | $d_{50}$ | $d_{50}'$ | with SEM |
| 40.9 | 45.3 | 2.9 | 10.9 | 2.5 | 2.4 | unrounded flat shape |

The value of $d_{50}'$ was not submicron.

Comparative Example 4

The air temperature in Example 5 was changed to 640° C. The following results were obtained.

TABLE 7

| | Collected amount | Components (wt %) | | | Particle diameter (μm) | |
|---|---|---|---|---|---|---|
| | (kg/h) | $FeS_2$ | $Fe_{1-x}S$ | $FeSO_4$ | $d_{50}$ | $d_{50}'$ |
| Overflow nozzle | 6.5 | 97 | 2 | 1 | 160 | 42 |
| Cyclone underflow | 4.8 | 90 | 1 | 5 | 65 | 15 |
| Electrostatic precipitator | 0.1 | 82 | 7 | 11 | 8 | 7 |

The value of $d_{50}'$ was not submicron because of sintering.

Example 7

The discharge gas which had left the electrostatic precipitator 12 in Example 6 was heated to 600° C. in an electric heater (discharge gas heater) 13, and then passed through a combustion chamber 15 having a capacity with a gas residence time of 1 second together with 8.5 $Nm^3$/hr air likewise heated to 600° C. with an electric heater. The air was introduced through a perforated plate so as to meet the discharge gas at right angles at a flow rate of about 20 m/sec. The thermometer disposed at the outlet of the combustion chamber 15 indicated 765° C. The discharge gas which had left the combustion chamber 15 was introduced into a rapidly-humidifying quenching tower which comprised a cylinder having a diameter of 200 mm and a height of 3,000 mm and in which 70° C. water was being sprayed in an upper part of the cylinder at a rate of 2 $m^3$/hr. The discharge gas was introduced into the upper part of the quenching tower in the same direction as the spray flow. After 36 hours, the tower was opened for inspection. As a result, no deposit was observed in the tower. The amount of sulfur in the discharge gas oxidized with air was calculated from the temperature increase in the combustion chamber 15, and was found to be 1.2 kg/hr. On the bottom of the rapidly-humidifying quenching tower, a red powder had accumulated in a slight amount (corresponding to a concentration in the discharge gas of 5 $mg/Nm^3$. Analysis by X-ray diffractometry revealed that the main component was $Fe_2O_3$.

The gas which had left the rapidly-humidifying quenching tower was introduced into an absorption tower (neutralizing device) 17 in which 10% caustic soda solution was being circulated. The acid gas was converted to $Na_2SO_3$, which was oxidized with air to $Na_2SO_4$ and removed. Neither sulfur nor an iron compound deposited in the absorption tower 17.

Comparative Example 5

The discharge gas which had left the electrostatic precipitator 12 in Example 6 was heated to 600° C. and introduced into a rapidly-humidifying quenching tower via a combustion chamber 15 without passing air. After 24 hours, the pressure difference between the tower top and the tower bottom abruptly increased from a water column height of 2 mm to a water column height of 500 mm. The tower was opened for inspection. As a result, it was found that the discharge gas flow path in the upper half of the tower had been narrowed to a diameter of about 10 mm by a black solid mass deposit. The black deposit was analyzed for components. As a result, the deposit was found to consist of 95 wt % sulfur and 5 wt % iron disulfide.

Example 8

The discharge gas which had left the electrostatic precipitator 12 in Example 6 and had the composition shown in Table 8 and which was flowing at a rate of 4 $Nm^3$/hr was mixed with 4.4 $Nm^3$/hr air to pressurize the mixed gas to a water column height of 500 mm. Thereafter, the mixed gas was heated to 420° C. and introduced into a reactor packed with 25 liters of vanadium pentoxide cylinders having an outer diameter of 8 mm, an inner diameter of 5 mm, and a height of 5 mm. The gas which had left the oxidation reactor was cooled to obtain 29 kg of 98% sulfuric acid in a liquid-receiving tank in 8 hours. The discharge gas which had left the cooler was treated with a magnesium hydroxide solution to absorb and remove the residual acid components, before the gas was discharged into the atmosphere.

TABLE 8

| | $SO_2$ | $H_2O$ | $N_2$ | $O_2$ | $S_8$ | $FeS_2$ |
|---|---|---|---|---|---|---|
| Vol % | 18.6 | 8.2 | 72.9 | 0 | 0.3 | 1.5 $mg/Nm^3$ |

Example 9

As in Example 8, the discharge gas which had left the electrostatic precipitator 12 and was flowing at a rate of 4 $Nm^3$/hr was mixed with 1.5 $Nm^3$/hr 98% $H_2S$ in such a proportion as to result in $H_2S/SO_2=2/1$. The mixed gas was passed successively through cylindrical first, second, and third reactors (sulfur recovery apparatus) 22 each packed with a catalyst comprising Co-Mo supported on alumina. The reactors 22 had constant inlet temperatures of 270° C., 230° C., and 230° C., respectively. The gas which had left the reactors 22 was cooled to 140° C. As a result, 31 kg of molten sulfur was recovered in total in 10 hours. The recoveries (based on the gas discharged from the respective preceding steps) were 70, 60, and 46%, respectively. The $H_2S$ and $SO_2$ concentrations in the discharge gas which had left the third reactor 22 were 1 vol % and 0.5 vol %, respectively. This gas was discharged after being burned in an incineration column.

Examples 10 to 12 and Comparative Examples 6 to 8

The catalysts obtained in Examples 1, 5, and 6 were used to conduct coal liquefaction, and the results obtained are shown in Table 9. The catalysts obtained in Comparative Examples 1, 2, and 3 were also used to conduct coal liquefaction, and the results obtained are shown in Table 10. These results are given in terms of wt % based on the coal excluding water and ash, on the assumption that the solvent did not change through the reaction.

An experiment on batch-wise coal liquefaction was conducted using as a reactor an autoclave equipped with an external coil heater and an electromagnetic stirrer, having a capacity of 1 liter, and made of SUS 316 stainless steel. As a feedstock coal, Indonesian coal was used after being dried and pulverized to 100-mesh (Tyler sieve) particles (ash content, 4.8 wt %). As a solvent was used an oil comprising hydrogenated anthracene as a main component. The coal and the solvent were sufficiently mixed to obtain a slurry feedstock. To the autoclave were charged 150 g of the slurry feedstock (a mixture of 60 g of the coal and 90 g of the solvent) and 3 wt % catalyst based on the coal. The inside of the autoclave was pressurized with hydrogen to 100 kg/cm$^2$ at room temperature. The coal was reacted at an internal temperature of 450° C. for 60 minutes while stirring the contents with a stirrer having propeller blades of the flinging-up type at a rotational speed of 1,000 rpm for gas/liquid/solid contact. The reaction time of 60 minutes means the period which began at the time when the reaction temperature of 450° C. had been reached and in which that reaction temperature was maintained. The time required for heating (heating rate, 6° C./min) and cooling (cooling rate, 15° C./min) was not compensated for. After the reaction, all the reaction products were recovered from the gas and suspension and analyzed. The gas components were analyzed by gas chromatography, the water content was determined by the Karl Fischer method, and the solid substances were analyzed by solvent extraction.

Asphaltene and preasphaltene were defined as polymeric substances which are insoluble in hexane extraction and soluble in tetrahydrofuran extraction. The unreacted coal was defined as a substance which is insoluble in tetrahydrofuran extraction and combustible, i.e., a carbonaceous substance. The amount of oil was determined as: (chemical hydrogen consumption+coal)−(water+gas+asphaltene+preasphaltene+unreacted coal).

TABLE 9

|  |  | Example | | |
|---|---|---|---|---|
|  |  | 10 | 11 | 12 |
| Kind of catalyst, Example | | 1* | 5 | 6* |
| **Chemical hydrogen consumption (wt %) | | 5.6 | 5.7 | 5.6 |
| ** | Water | 8.1 | 7.9 | 8.6 |
| Coal liquefaction products (wt %) | Gas | 15.4 | 14.9 | 13.9 |
| | Oil | 68.3 | 68.8 | 68.7 |
| | Asphaltene | 10.9 | 11.5 | 11.5 |
| | Preasphaltene | | | |
| | Unreacted coal | 2.9 | 2.6 | 2.8 |
| Specific gravity of oil | | 1.0078 | 1.0080 | 1.0090 |

*A weighted mean blend of the catalyst obtained through the overflow nozzle and that obtained through the cyclone underflow, in Examples 1 and 6.
**wt % based on the feedstock coal excluding the water and ash contained in the coal.

TABLE 10

|  |  | Comparative Example | | |
|---|---|---|---|---|
|  |  | 6 | 7 | 8 |
| Kind of catalyst, Comparative Example | | 1 | 2* | 3 |
| **Chemical hydrogen consumption (wt %) | | 4.5 | 4.7 | 4.5 |
| ** | Water | 7.2 | 7.5 | 7.3 |

TABLE 10-continued

|  |  | Comparative Example | | |
|---|---|---|---|---|
|  |  | 6 | 7 | 8 |
| Coal liquefaction products (wt %) | Gas | 16.5 | 17.0 | 16.7 |
| | Oil | 63.5 | 65.7 | 59.0 |
| | Asphaltene | 11.6 | 11.7 | 15.6 |
| | Preasphaltene | | | |
| | Unreacted coal | 5.7 | 2.8 | 5.9 |
| Specific gravity of oil | | 1.0140 | 1.0122 | 1.0150 |

*A weighted mean blend (weighted mean) of the catalyst obtained through the overflow nozzle and that obtained through the cyclone underflow, in Comparative Example 2.
**wt % based on the feedstock coal excluding the water and ash contained in the coal.

Example 13

Into 2-liter beakers each containing 825 g of gas oil were respectively introduced 675 g of the particles obtained through the overflow nozzle 8 in Example 1 and 675 g of the particles obtained from the cyclone 10 in Example 1. Each beaker was provided with a high-shear dispersing device having a diameter of 18 mm and two gears, and the contents were continuously agitated at 22,000 rpm (tip speed, 20 m/sec) for 10 minutes. Thereafter, the slurries were analyzed by laser diffractometry. The results obtained are shown in Table 11, in which $d_{10}$, $d_{50}$ and $d_{90}$ are particle diameter values respectively for the cumulative volume percentages of 10, 50 and 90%.

TABLE 11

| Particle collection place | $d_{10}$ | $d_{50}$ | $d_{90}$ |
|---|---|---|---|
| Overflow nozzle | 1.4 | 2.7 | 6.4 |
| Cyclone | 1.2 | 2.5 | 6.0 |

Example 14

An experiment was conducted using the same equipment under the same conditions as in Examples 10 to 12 and Comparative Examples 6 to 8, except that the catalyst obtained in Example 1 was used and that coal was not introduced. That is, a homogeneous blend ($d_{50}$=110 μm) of the particles collected through the overflow nozzle 8 ($d_{50}$=157 μm) and those collected through the cyclone underflow 11 ($d_{50}$=64 μm) both obtained in Example 1 was introduced in an amount of 1.8 g (corresponding to 3% by weight based on coal) into the autoclave together with 90 g of the solvent, and reacted. After completion of the reaction, the solid matter was separated from the solvent with a filter paper, washed with tetrahydrofuran, and then air-dried.

This solid matter was an extremely fine powder. The $d_{50}$ thereof as determined by laser diffractometry was 3 μm. Examination by X-ray diffractometry for components revealed that the powder consisted substantially of $Fe_{1-x}S$.

Although there was a fear that the solid particles might have undergone re-aggregation during the filtration, washing, and air-drying steps, the above results show that the sulfide was present in a finely dispersed state when used in coal liquefaction or heavy-oil hydrocracking.

Example 15 and Comparative Example 9

As a preheater for use in a coal liquefaction plant was used a low-frequency induction heating furnace containing a stainless-steel coil which had an inner diameter of 10 mm and a length of 85 m and which had been wound in a spiral form having a diameter of 0.8 m and housed in an insulated box. In a storage tank, a slurry was prepared beforehand which consisted of 40 wt % coal, 1.2 wt % catalyst, and 58.8 wt % creosote oil as a solvent. This slurry was pressurized to 170 kg/cm$^2$G with a pressure pump, and fed to the preheater through a lower inlet thereof at a rate of 100 kg/hr. Just before the inlet, hydrogen gas having a purity of 99 vol % and pressurized to 175 kg/cm2G was mixed with the slurry at a rate of 60 NM$^3$/hr. This mixture was preheated.

The temperature at the preheater outlet was regulated to 450° C.

The pressure of an inlet part of the preheater and that in an outlet part thereof were measured, and the difference between these was monitored.

Results in Example 15

As a catalyst was used a homogeneous blend of the particles collected through the overflow nozzle 8 and those collected through the cyclone underflow 11 both in Example 1. The plant was operated for 25 days, during which the pressure difference stayed constant at 15 kg/cm$^2$. After the operation, part of the preheating coil was cut to examine the inner surface. As a result, no deposit was observed.

Results in Comparative Example 9

As a catalyst was used a mixture consisting of 45 wt % iron powder of 2 μm and 55 wt % elemental sulfur of 30 μm.

The pressure difference gradually increased from 15 kg/cm$^2$ after initiation of operation, and reached 40 kg/cm$^2$ at 15 days after the initiation, making it impossible to conduct feeding by pumping. After the operation, the preheating coil was cut. As a result, it was found that the inner circumferential surface had a black rigid deposit about 2 mm thick. This deposit contained 95 wt % inorganic components including ashes, and 50% of the inorganic components was accounted for by iron and iron compounds.

Example 16 and Comparative Example 10

Using the same reactor as in Examples 10 to 12 and Comparative Examples 6 to 8, an Arabian heavy vacuum distillation residue containing 95 wt % fraction having a boiling point of 520° C. or higher was hydrogenated.

To the autoclave were charged the distillation residue and a catalyst in a total amount of 150 g. The same conditions as in Examples 10 to 12 and Comparative Examples 6 to 8 were used, except that the inside of the autoclave was pressurized with hydrogen to 140 kg/cm$^2$ at room temperature, and that the reaction temperature was changed to 460° C. The degree of hydrocracking was determined using the following equation. The distillation residue having boiling points of 520° C. and above includes an oil having a boiling point of 520° C. or higher and a matter insoluble in hexane extraction, and does not include catalyst components.

$$\text{Degree of hydrocracking(wt\%)} = \left(1 - \frac{\text{Proportion of distillation residue having boiling points of 520°C. or higher in reaction products}}{\text{Proportion of distillation residue having boiling points of 520°C. or higher in feedstock oil}}\right) \times 100$$

The results of the use of the catalyst obtained in Example 1 and the results of the use, as a Comparative Example, of the catalyst obtained in Comparative Example 3 by pulverizing natural pyrite are shown in Table 12. Each catalyst was added in an amount of 3% by weight based on the feedstock.

TABLE 12

| | | Example 16 | Comparative Example 10 |
|---|---|---|---|
| Chemical hydrogen consumption (wt %) | | 2.2 | 1.9 |
| Product composition (wt %) | Gas | 13.0 | 15.0 |
| | Oil having boiling point of IBP to 520° C. | 75.5 | 69.5 |
| | Oil having boiling point of 520° C. or higher | 10.0 | 11.4 |
| | Hexane extraction insoluble matter | 3.7 | 6.0 |
| Degree of hydrocracking (wt %) | | 85.6 | 81.7 |

IBP represents the initial boiling point

Possibility of Industrial Application

According to the present invention, the iron disulfide yielded has a high purity, is in a granular form having excellent handleability, and can be reduced into submicron particles by a simple disaggregation operation.

According to the process of the present invention, the iron disulfide can be efficiently produced from ferrous sulfate monohydrate and either elemental sulfur or hydrogen sulfide.

The compound produced, when used, e.g., as a catalyst for coal liquefaction, exhibits high activity in the hydrogenation reaction to give an oil from the coal in high yield.

The acid gas which generates in the production is recovered as sulfuric acid and elemental sulfur through oxidation and reduction, respectively. The sulfuric acid can be used for iron sulfate production together with scrap iron or the like. Namely, a non-polluting resource-saving production process is possible in which by-products are reused as starting materials. Since the present invention can thus provide a finely particulate high-purity iron sulfide which can satisfy technical and practical requirements, the present invention is of extremely high industrial value from the standpoint of effective utilization of resources.

We claim:
1. Iron sulfide, comprising:
   from 85 to 100 percent by weight FeS$_2$,
   from 0 to 5 percent by weight Fe$_{1-x}$S, wherein x is a number ranging from 0 to 0.2,
   from 0 to 5 percent by weight of Fe$_3$O$_4$, and
   from 0 to 10 percent by weight of FeSO$_4$;
   wherein said iron sulifide comprise primary and secondary particles,
   wherein said primary particles have a particle diameter ranging from 10 to 400 nm, and
   wherein said secondary particles have a 50 percent volume cumulative particle diameter ranging from 20 to 300 micrometers; and
   wherein said iron sulfide was formed by a process comprising the steps of:
   introducing an iron sulfate comprising ferrous sulfate monohydrate and at least a stoichiometric amount of at least one sulfur compound into the fluidized bed of a furnace; and then
   fluidizing, burning and reacting the ingredients at a temperature ranging from 350 to less than 630° C., at a superficial velocity of at least 0.1 m/sec, and at a pressure of at least 1 atm, wherein air is used as a fluidizing gas for supplying heat necessary for maintaining the reaction temperature by sulfur combustion;

wherein said ferrous sulfate monohydrate has a 50 percent volume cumulative particle diameter ($d_{50}$) ranging from 20 to 300 micrometers; and wherein said at least one sulfur compound is chosen from elemental sulfur in a powder, melt and vapor state and hydrogen sulfide.

2. An iron sulfide as claimed in claim 1, wherein said secondary particles have a 50 percent volume cumulative particle diameter ($d_{50}$) ranging from 50 to 200 micrometers.

3. An iron sulfide as claimed in claim 1, wherein said secondary particles have a 50 percent volume cumulative particle diameter ($d_{50}$) ranging from 100 to 200 micrometers.

4. An iron sulfide as claimed in claim 1, wherein said primary particles have a particle diameter ranging from 25 to 200 nm.

5. An iron sulfide as claimed in claim 1, wherein said primary particles have a rounded shape.

6. An iron sulfide as claimed in claim 1, wherein said secondary particles have a 50 percent volume cumulative diameter ($d_{50}$) of 5 micrometers or smaller upon disaggregation by ultrasonic treatment or by a high shear dispersion treatment.

7. A process for producing an iron sulfide comprising:

introducing an iron sulfate comprising ferrous sulfate monohydrate and at least a stoichiometric amount of at least one sulfur compound into the fluidized bed of a furnace; and then fluidizing, burning and reacting the ingredients at a temperature ranging from 350 to less than to 630° C., at a superficial velocity of at least 0.1 m/sec, and at a pressure of at least 1 atm, wherein air is used as a fluidizing gas for supplying heat necessary for maintaining the reaction temperature by sulfur combustion;

wherein said ferrous sulfate monohydrate has a 50 percent volume cumulative particle diameter ($d_{50}$) ranging from 20 to 300 micrometers; and wherein said at least one sulfur compound is chosen from elemental sulfur in a powder, melt and vapor state and hydrogen sulfide.

8. A process as claimed in claim 7, wherein said iron sulfate comprising ferrous sulfate monohydrate has a 50 percent volume cumulative particle diameter ($d_{50}$) ranging from 50 to 200 micrometers.

9. A process as claimed in claim 7, wherein said iron sulfate comprising ferrous sulfate monohydrate has a 50 percent volume cumulative particle diameter ($d_{50}$) ranging from 100 to 200 micrometers.

10. A process as claimed in claim 7, further comprising:

(a) collecting iron sulfide particles having a 50 percent volume cumulative diameter ($d_{50}$) of 200 micrometers or smaller through an overflow nozzle disposed above said fluidized bed; collecting iron sulfide particles having a 50 percent volume cumulative diameter ($d_{50}$) of 100 micrometers or smaller with a cyclone from a fluid gas leaving the furnace through a furnace-overhead nozzle disposed at a top portion of the furnace, and further collecting iron sulfide particles having a 50 percent volume cumulative diameter ($d_{50}$) of 25 micrometers or smaller with a dust collecting apparatus selected from an electrostatic precipitator, a bag filter, a ceramic filter and a filter packed with particles;

(b) heating a portion of the gas leaving the dust collecting apparatus to 300° C. or higher with a heater;

(c) mixing the heated portion of gas with at least a stoichiometric amount of air with respect to the unreacted sulfur in the gas;

(d) combusting the mixture of the heated portion of the gas and the air in a combustion furnace;

(e) passing the combustion off-gas through a scrubber through which an alkaline solution is circulating to remove the sulfur dioxide out of the combustion off-gas;

(f) passing the other, remaining portion of the gas leaving the dust collecting apparatus of step (b) into either or both of the following steps (i) and (ii):

(i) a sulfuric acid production unit to convert the sulfur values in the gas into sulfuric acid, wherein the sulfuric acid is transferred into an iron sulfate production unit where the sulfuric acid is reacted with an iron component to produce iron sulfate and recycling the iron sulfate back to the furnace, and/or (ii) an elemental sulfur recovery unit to recover sulfur from the gas and recycle the sulfur back to the furnace.

11. A process as claimed in claim 10, wherein said iron sulfate comprising ferrous sulfate monohydrate have a 50 percent volume cumulative diameter ($d_{50}$) ranging from 50 to 200 micrometers.

12. A process as claimed in claim 10, wherein said iron sulfate comprising ferrous sulfate monohydrate have a 50 percent volume cumulative diameter ($d_{50}$) ranging from 100 to 200 micrometers.

* * * * *

UNITED STATES PATENT AND TRADEMARK OFFICE
CERTIFICATE OF CORRECTION

PATENT NO.   : 6,056,935
DATED        : May 2, 2000
INVENTOR(S)  : Tadashi KAI et al.

It is certified that error appears in the above-identified patent and that said Letters Patent is hereby corrected as shown below:

Claim 11, col. 22, line 41, "have" should read --has--.

Claim 12, col. 22, line 45, "have" should read --has--.

Signed and Sealed this

Tenth Day of April, 2001

NICHOLAS P. GODICI

*Attest:*

*Attesting Officer*       Acting Director of the United States Patent and Trademark Office